United States Patent [19]
Simatic et al.

[11] Patent Number: 5,848,228
[45] Date of Patent: Dec. 8, 1998

[54] METHOD OF ORDERING A PLURALITY OF MESSAGES FROM A PLURALITY OF SOURCES AND SYSTEM FOR IMPLEMENTING THE METHOD

[75] Inventors: Michel Simatic, Evry; Edward Hurst-Frost, Meudon; Laurent Junot, Voisins le Bretonneux; Bruno Kohen, Paris; Olivier Orban, Marcoussis, all of France

[73] Assignee: Cegelec, Levallois Perret, France

[21] Appl. No.: 773,358

[22] Filed: Dec. 26, 1996

[30] Foreign Application Priority Data

Dec. 28, 1995 [FR] France .................................. 95 15655

[51] Int. Cl.⁶ .................................................. C06F 11/00
[52] U.S. Cl. .............................. 395/182.02; 395/200.68
[58] Field of Search .................................. 395/180–188, 395/200.01–200.83; 370/216, 217, 218, 219, 220, 221, 222, 223, 224, 225, 226, 227, 228; 379/220, 221; 455/7, 8, 13.1, 49.1, 103

[56] References Cited

U.S. PATENT DOCUMENTS 5,363,503  11/1994  Gleeson .............................. 395/182.08
5,671,215  9/1997  Foglar ...................................... 370/227

FOREIGN PATENT DOCUMENTS 2129199  1/1996  Canada .......................... H04L 12/46

OTHER PUBLICATIONS

S. Navaratnam et al, "Reliable Group Communication in Distributed Systems", *8th International Conference on Distributed Computing Systems*, Jun. 13–17, 1988, San Jose, California, pp. 439–446.

*Primary Examiner*—Joseph Palys
*Attorney, Agent, or Firm*—Sughrue, Mion, Zinn, Macpeak & Seas, PLLC

[57] ABSTRACT

A method is described for ordering a plurality of messages from a plurality of sources wherein, in order for all the application processes to receive the messages in the same order, a single relay process common to all the sources is selected from the application processes, the other application processes constituting slave processes. All messages broadcast by the sources are rebroadcast from the relay process to all the application processes, including the relay process. The relay process processes data from all messages that it rebroadcasts. The slave process processes only data from messages received via the relay process, data from messages received directly from the sources not being processed. Applications include data processing systems, in particular where part of the software is replicated.

12 Claims, 8 Drawing Sheets

METHOD OF ORDERING A PLURALITY OF MESSAGES FROM A PLURALITY OF SOURCES AND SYSTEM FOR IMPLEMENTING THE METHOD

BACKGROUND OF THE INVENTION

1. Field of the Invention

The invention concerns a method of and a system for ordering a plurality of messages from a plurality of sources addressed to a plurality of application processes so that all the application processes receive the messages in the same order. The invention applies in particular to a data processing system including a plurality of application processes that are replicas of one and the same application process, the replication being effected to enhance the reliability of the system, for example.

2. Description of the Prior Art

One way to guarantee the consistency of data in a system of this kind is to design the software of the system so that all the application processes behave as state machines, i.e. so that the behavior of an application process depends only on the data applied to an input of the process and on the order in which the data is applied to that input. Consequently, if the same data stream is applied to all the replicas of one and the same application process it is certain that the replicas will behave consistently. The data supplied to the various application processes of a system generally originates from a plurality of sources. Persons skilled in the art know how to implement a source of data broadcasting a series of messages to a plurality of application processes in a reliable and orderly manner. This broadcasting is reliable when it is certain that all of the addressee processes receive each broadcast message. It is orderly when it is certain that each addressee process receives the series of messages in the same order.

When a plurality of sources send respective series of messages to a plurality of application processes, there is no guarantee that the messages will be received in the same order by the various processes, even if each source taken individually sends the messages in a reliable and orderly manner. It is feasible to use the same reliable and orderly broadcast protocol for the various sources. This solution cannot always be applied, however, since in some cases there is no control over the broadcast protocol used by some data sources.

U.S. Pat. No. 5,363,503 describes a method of maintaining the consistency of data in a multiprocessor data processing system in which so-called primary application processes are duplicated at least once in the form of a back-up process to protect the system against the consequences of a processor failure. The processes carry out durable actions such as writing to a disk.

This method includes several steps.

One step is providing each processor with a message memory and a counter for counting the number of times the message memory is written.

The next is storing in memory data describing external events and their occurrence relative to internal events.

Another step, before any durable action of the processor supporting a primary process, is transmitting to the back-up process at least some of the messages in memory and the data describing external events and their occurrence relative to internal events.

In the event of failure of the processor supporting a primary process, the back-up process performs the processing of the messages and the data transmitted to it to ready the back-up process for replacing the primary process.

This method has the drawback of being complex to implement.

An aim of the invention is to propose a method that is easier to implement than the prior art method.

SUMMARY OF THE INVENTION

The invention consists in a method of ordering a plurality of messages from a plurality of sources addressed to a plurality of application processes able to process data from said messages, each source broadcasting a series of messages in a reliable and orderly manner and each receiving application process being capable of rebroadcasting a series of messages in a reliable and orderly manner to all said application processes, wherein, in order for all said receiving application processes to receive said messages in the same order, the method involves:

selecting from the application processes a single relay process common to all the sources, the other application processes constituting slave processes;

rebroadcasting all messages broadcast by the sources from the relay process to all the application processes, including the relay process;

processing in the relay process data from all messages that it rebroadcasts; and processing in the slave processes only data from messages received via the relay process, data from messages received directly from the sources not being processed.

The invention also consists in a variant of the above method consisting in choosing a plurality of relay processes, a relay process being chosen for a plurality of sources, but each source having only one relay process, and all the relay processes applying the same reliable and orderly broadcast protocol.

The above method assures reliable and orderly broadcasting since a channel passes through the relay process(es) that serialize(s) messages from the various sources in a particular order and rebroadcasts them reliably.

In a preferred embodiment, in order to remedy failure of the current relay process, the method in each slave process receiving a message includes:

storing the message if a the slave process has not received it already via the relay process;

then deleting it if the slave process subsequently receives it via the relay process; and rebroadcasting, then deleting, all messages stored and not yet deleted if the current relay process has failed and if the slave process concerned becomes the new relay process common to all sources.

In a preferred embodiment, in order to determine, in a slave process, if the slave process has already received a message broadcast by a source via the relay process before it receives it directly from a source, the method includes:

decrementing a counter specific to the slave process and the source each time that the slave process receives a message from the source via the relay process;

incrementing the counter each time the slave process receives a message from a source directly; and concluding that the slave process has not already received a message broadcast by a source via the relay process if and only if the algebraic value of the counter is positive.

This embodiment is particularly simple since it enables monitoring of the correct operation of a relay process by a single counter in each slave process.

The invention also consists in a system for implementing the above method.

The invention will be better understood and other details of the invention will emerge from the following description and the accompanying drawings.

DETAILED DESCRIPTION OF THE PREFERRED EMBODIMENT

Figure 1:
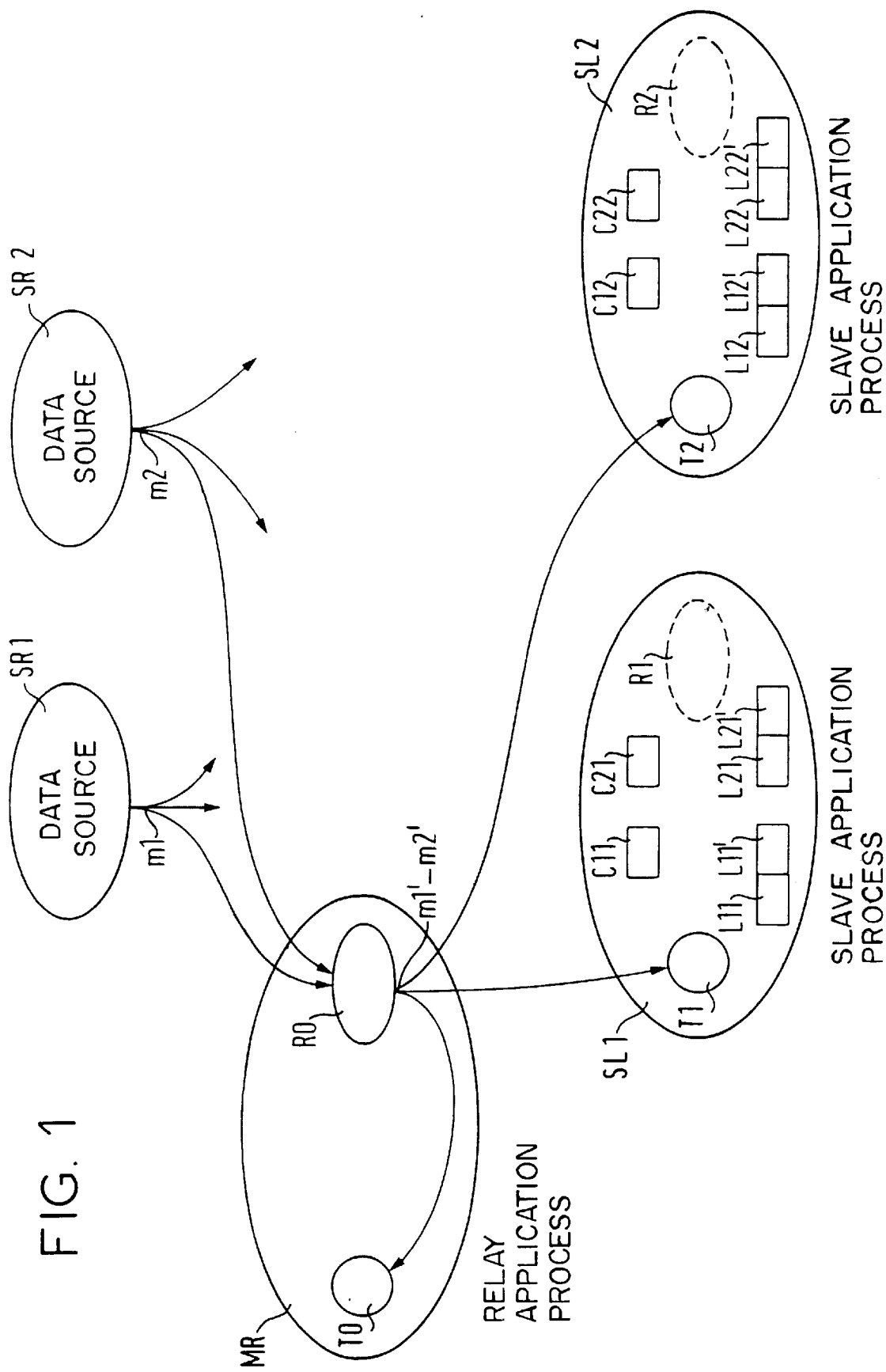
FIG. 1 is a diagram showing one example of a data processing system and illustrating a first embodiment of the method of the invention.

The data processing system shown in diagrammatic form in FIG. 1 includes two sources of data SR1, SR2 and three application processes MR, SL1, SL2 to which the data is addressed. The data sources SR1 and SR2 can be application processes. Neither of them receives data sent by the other. Each of the sources SR1, SR2 sends a stream of messages to all of the application processes MR, SL1, SL2. Each source broadcasts its stream of messages in a reliable and orderly manner, but it is not possible (at least in this example) to coordinate the sending of two streams of messages so that on reception in each of the application processes MR, SL1, SL2 the two streams of messages interleave in the same order.

The application processes MR, SL1, SL2 include respective processing parts T0, T1, T2 for processing data from the respective messages received by these application processes.

Each application process MR, SL1, SL2 includes a respective part R0, R1, R2 capable of rebroadcasting a series of messages in a reliable and orderly manner to all the application processes, including the processing part of the same application process.

In the first embodiment of the method of the invention, the aim is to choose from the application processes MR, SL1, SL2 a process constituting a relay process, of which there is only one and which is common to all the sources SL1, SL2. In this example the process MR is chosen as the relay process. The other application processes SL1 and SL2 constitute slave processes. The function of the relay process MR is to receive all the messages broadcast by all the sources SR1, SR2 and to rebroadcast them in a reliable and orderly manner to all the application processes, including itself (its processing part T0).

In the relay process MR the part R0 is activated to rebroadcast in a reliable and orderly manner all messages that the relay process MR receives. The rebroadcast messages are identifiable as such. In the slave processes SL1 and SL2 the parts R1 and R2 are inactive, but can be activated subsequently in the event of failure of the current relay process MR (see below).

A first feature of the method of the invention is that the slave processes SL1, SL2 refuse to process data from messages received directly from the sources SR1, SR2. In this example, the sources SR1 and SR2 respectively send a message m1 and a message m2 which are received in any order by the application process MR. They are received by the application process SL1 in any order that is independent of the previous order and by the application process SL2 in any order that is independent of the previous orders.

The relay process MR receives the messages m1 and m2 sent by the sources SR1 and SR2 in the order m1–m2, for example. The part R0 retransmits these messages in the form of messages m1'–m2' in a reliable and orderly manner to the processing part T0 of the relay process MR and to the slave processes SL1 and SL2, for immediate processing of the data contained in these messages by the processing parts T0, T1, T2, respectively. The fact that the two messages m1 and m2 are rebroadcast by the same relay process MR ensures that all the processing parts T0, T1, T2 receive the replicas m1'–m2' of the messages m1–m2 in the same order.

Additional features of the method of the invention remedy failure of the application process used as the relay. In this example, these additional features employ two counters C11, C21 and four log registers L11, L21, L11', L21' in the slave process SL1 and two counters C12, C22 and four log registers L12, L22, L12', L22' in the slave process SL2. The counters C11, C12 and the log registers L11, L11', L12, L12' are specific to the source SR1. The counters C21, C22 and the log registers L21, L21', L22, L22' are specific to the source SR2. Their operation is described later. The log registers L11', L12', L21', L22' are used only during an initialization phase and store only messages received via the relay process MR. The log registers L11 and L12 are used to store messages sent by the source SR1 and received directly. The log registers L21 and L22 are used to store messages sent by the source SR2 and received directly. All these log registers are memories of the first-in/first-out type.

Figure 2:
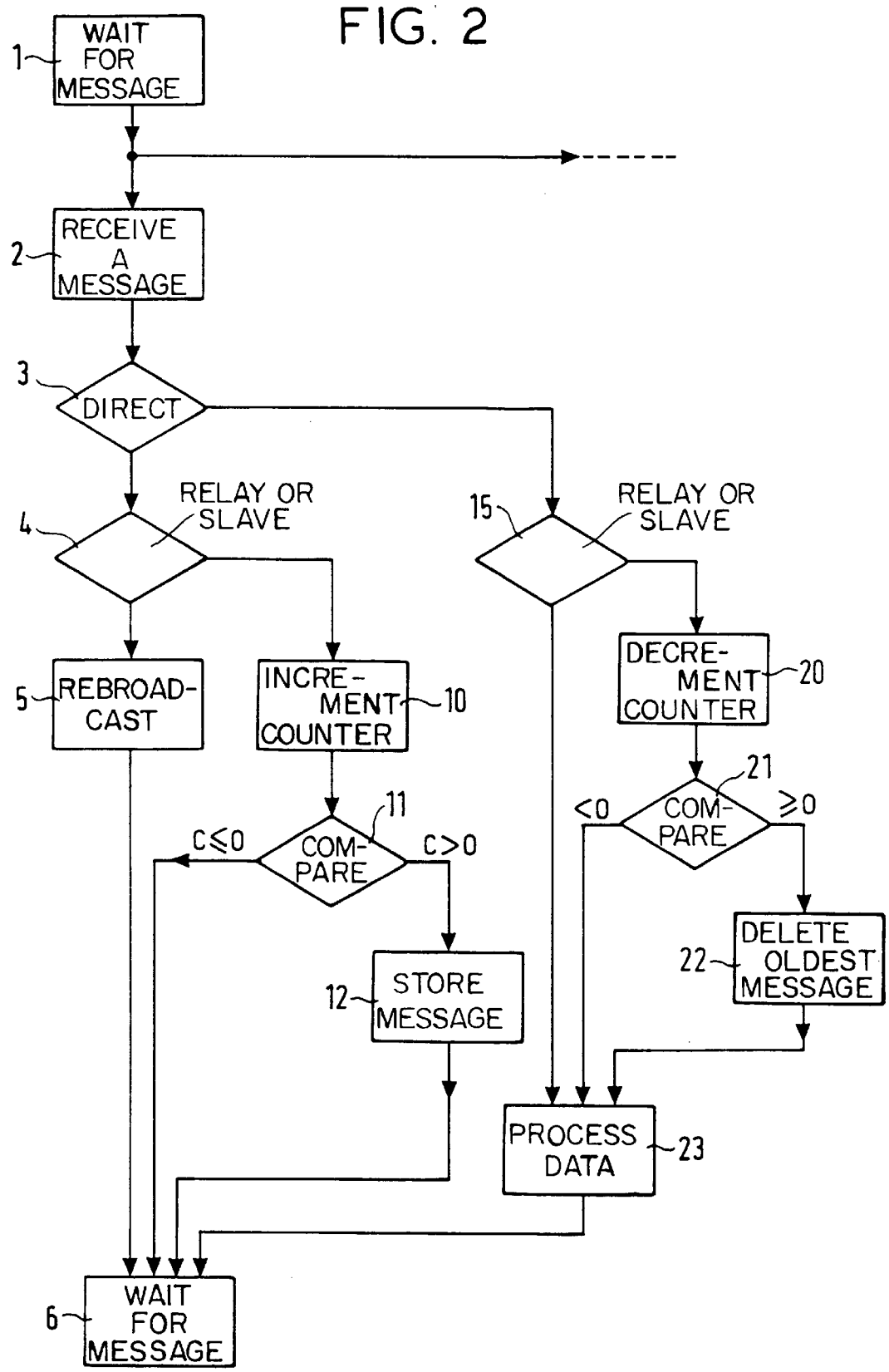
FIGS. 2 and 3 constitute a flowchart of the operations of this first embodiment.
Figure 3:
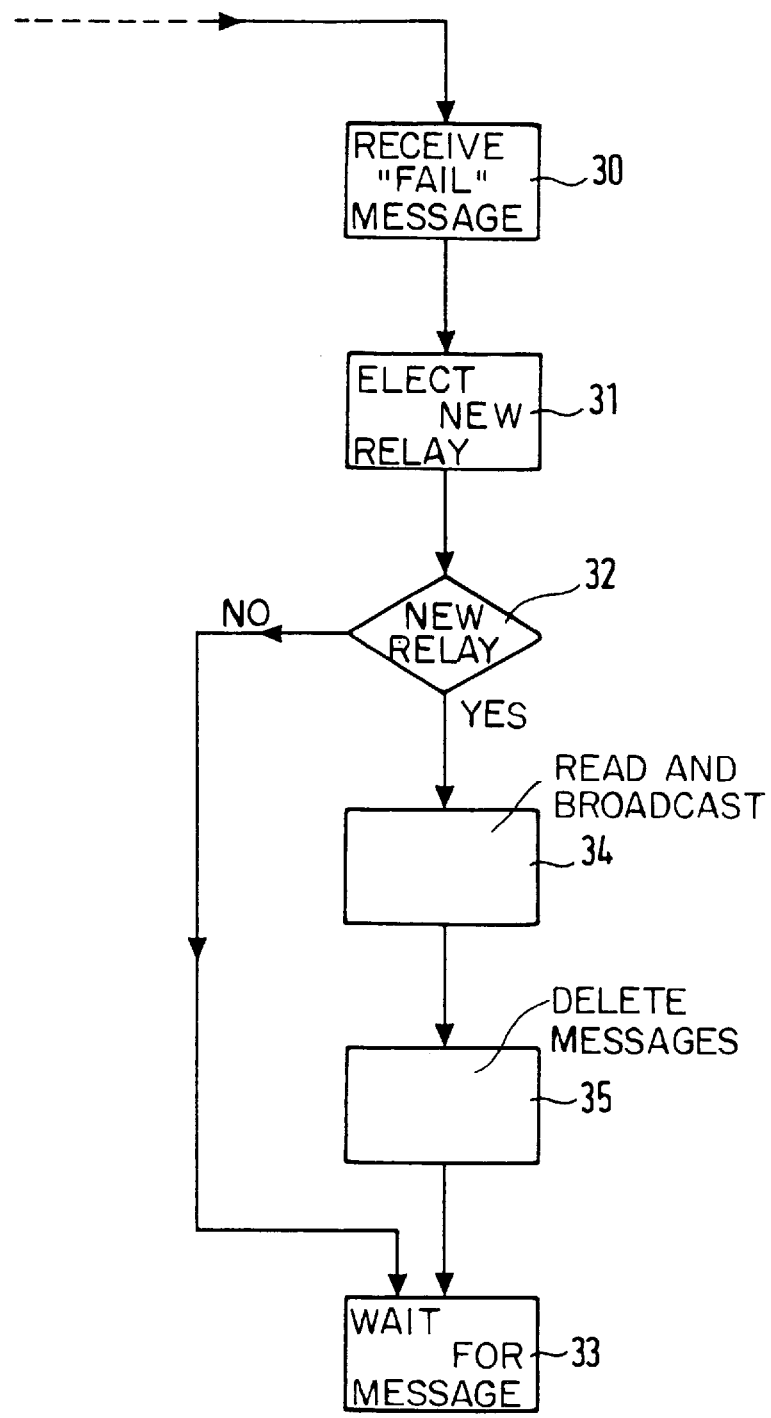
Figure 5:
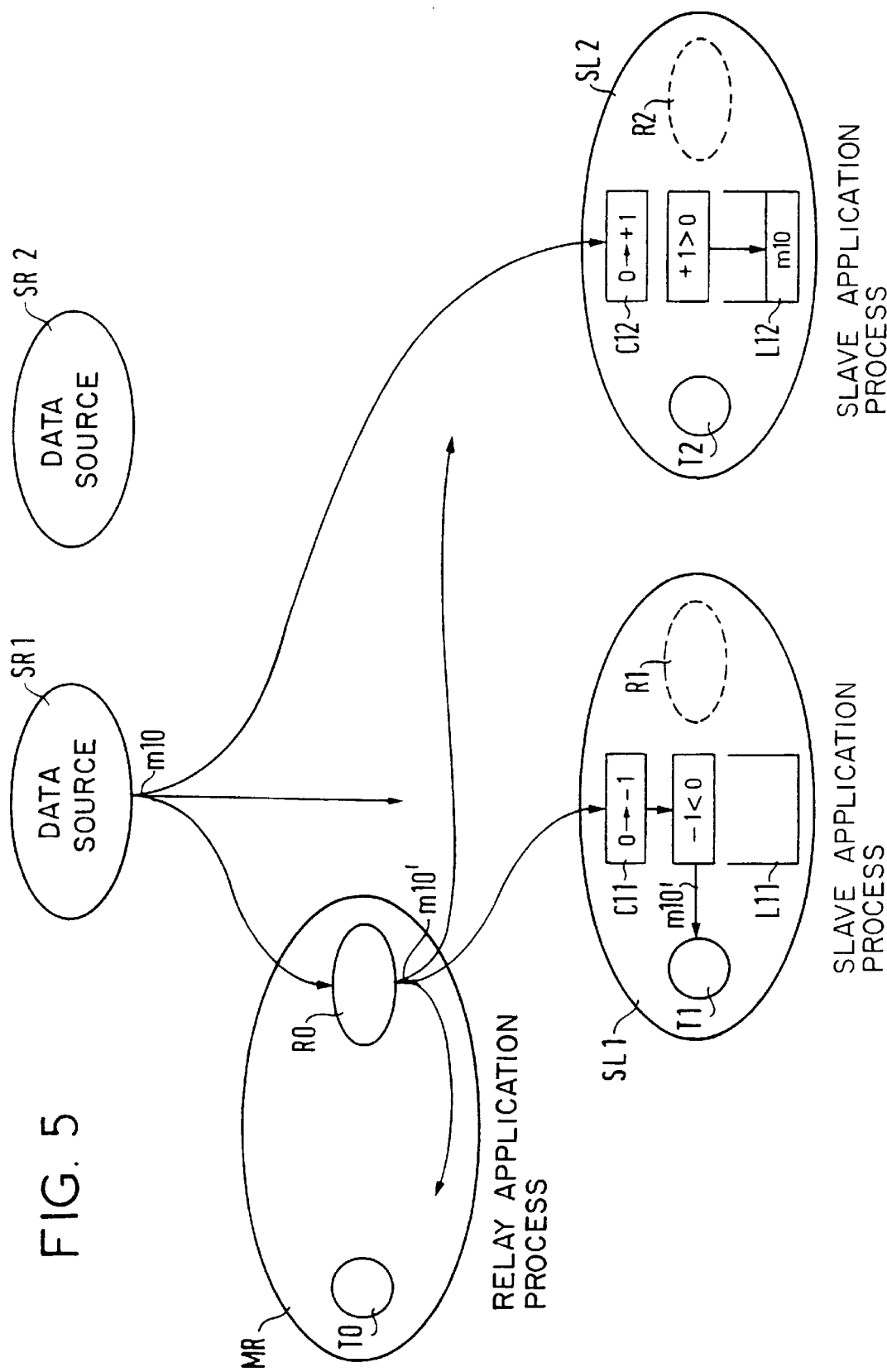
FIGS. 5 and 6 illustrate the situation in which application processes receive a message directly from a source before receiving the same message rebroadcast by a relay process.
Figure 6:
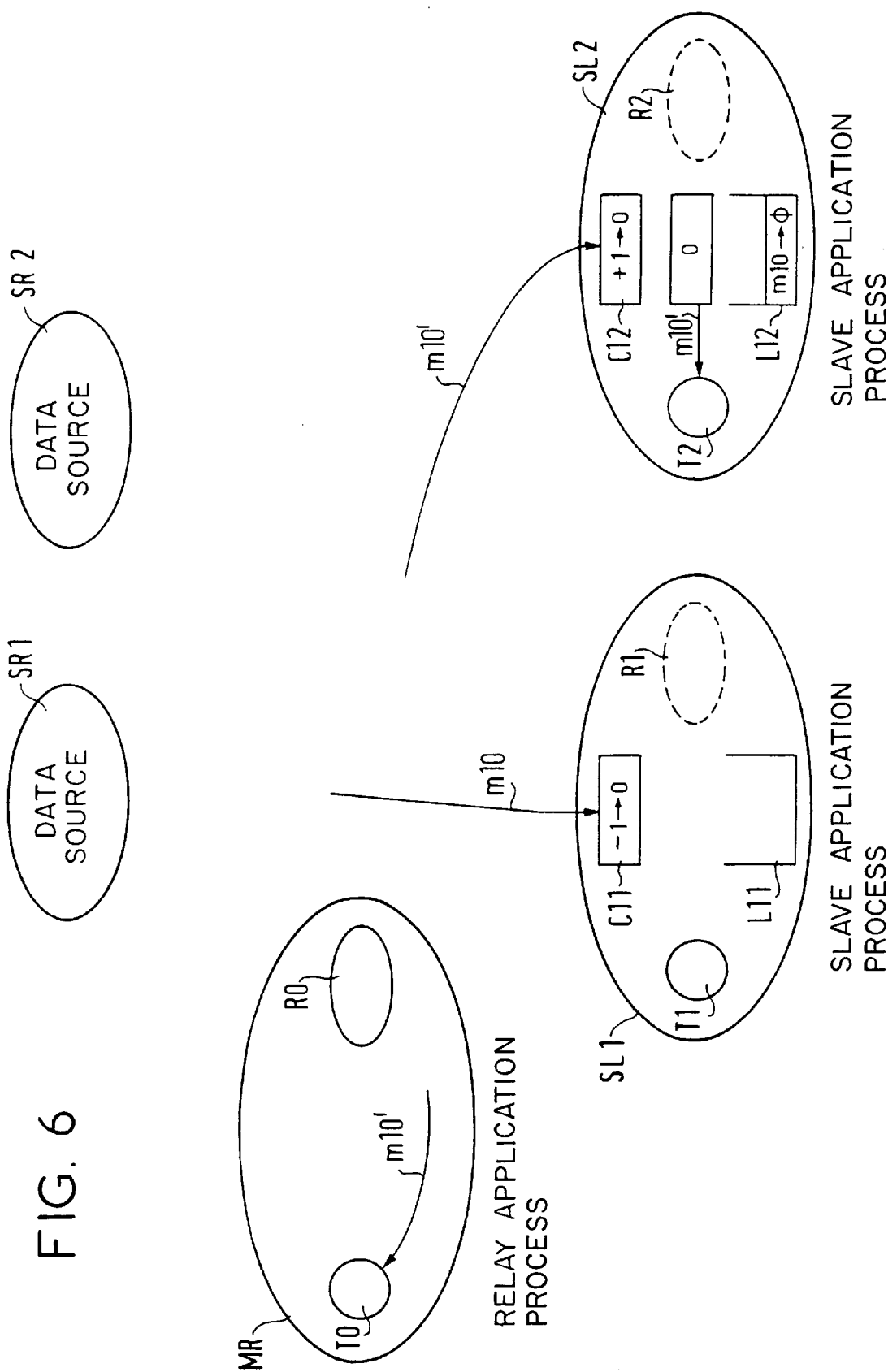
Figure 7:
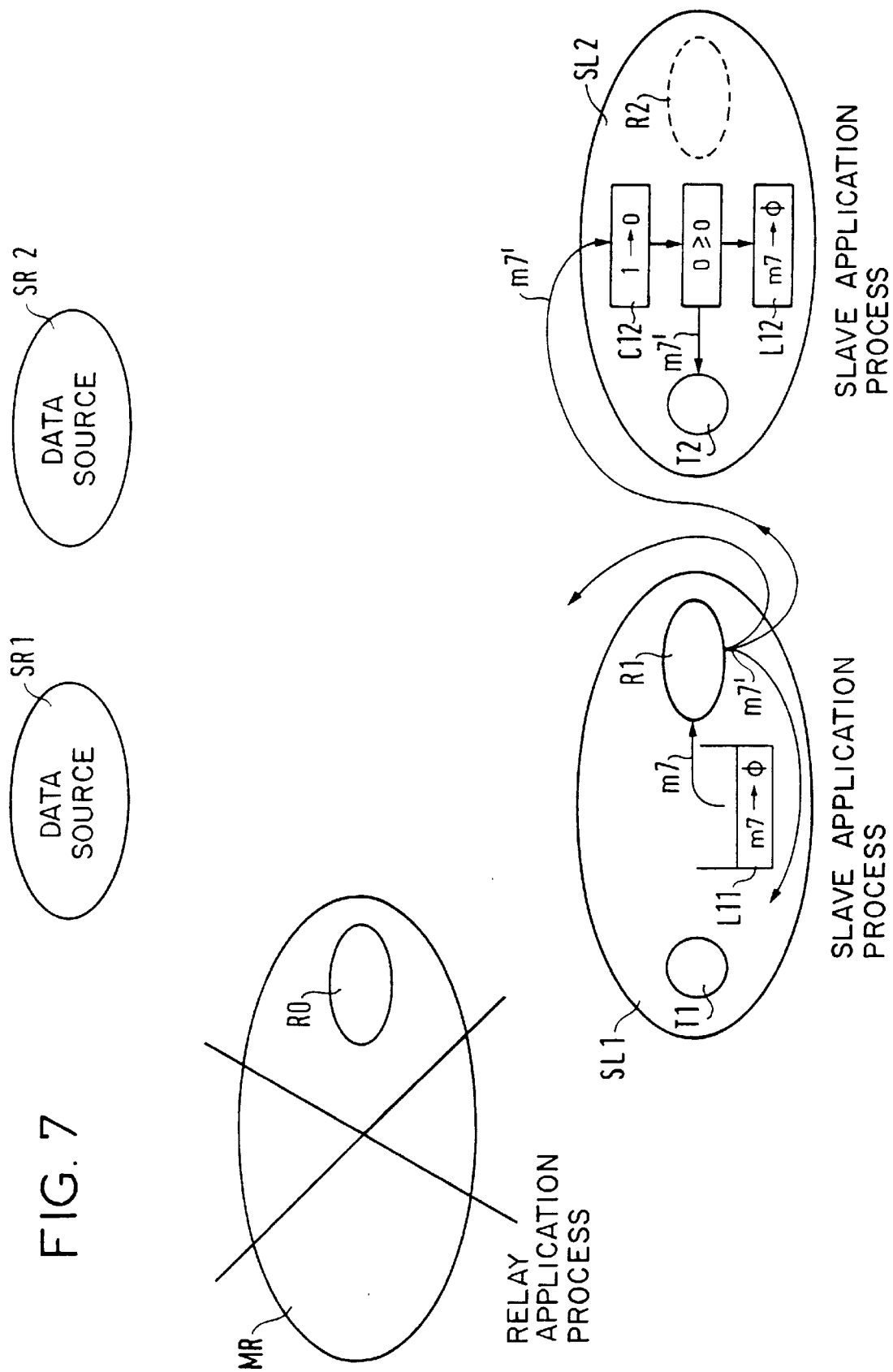
FIG. 7 illustrates the situation in which the current relay process has failed and has been replaced by a new relay process.

FIG. 2 shows a first part of the flowchart of the operations carried out in the first embodiment. This first part concerns normal operation of the single relay process that is common to all the sources. FIG. 3 shows another part, including the operations carried out if the slave application process receives a message indicating that the current relay process has failed. FIGS. 5 through 7 then illustrate these operations by means of examples.

In FIG. 2, operation 1 consists in waiting for a message. Operation 2 consists in a receiving a message other than a "relay failed" message. Operation 3 consists in determining the origin of the message received:

If operation 3 concludes that the message has come directly from the source SR1, SR2, operation 4 consists in determining if the application process that received the message is the relay process or a slave process:

If this application process is the relay process MR, operation 5 consists in rebroadcasting the received message in a reliable and orderly manner to all of the application processes, including the processing part of the process concerned. Operation 6 then consists in waiting for another message.

If the process concerned is not the relay process MR, operation 10 consists in incrementing a counter in the process concerned and corresponding to the source that sent the message concerned. For example, this is the counter C11 if the process concerned is the slave process SL1 and if the source that sent the message concerned is the source SR1.

Operation 11 then consists in comparing the algebraic value of this counter to zero:

If the algebraic value is negative or zero, the next operation is operation 6 which consists in waiting for another message, since this algebraic value represents the fact that the broadcasting by the relay process was in advance of the direct broadcasting of messages from the source SR1 to the slave process SL1, for example.

If the algebraic value of the counter is positive, operation 12 then consists in storing the message in a log register in the slave process concerned and corresponding to the source that sent the message concerned. For example, this is the log register L11 in the slave process SL1 for a message sent by the source SR1. Operation 6 then consists in waiting for another message. The positive algebraic value corresponds to a delay in the rebroadcasting by the relay process MR of messages sent by the source SR1 in this example. This time-delay could be due to the failure of the relay process MR. This is why operation 12 consists in backing up the message in a log register L11. The slave process is not entitled to process data from this message since it was received directly from the source SR1.

If operation 3 concludes that the message received is a message rebroadcast by the relay process MR, operation 15 then consists in determining if the process that received the message is the relay process or a slave process:

If the process concerned is the relay process MR, operation 23 consists in processing the data contained in the message in the processing part T(n) of this process. Operation 6 then consists in waiting for another message.

If the process concerned is a slave process SL1 or SL2, operation 20 consists in decrementing a counter in the process concerned and corresponding to the source that sent the message concerned: for example, this is the counter C11 in the slave process SL1 if the message was sent by the source SR1, for example. Operation 21 then consists in comparing the algebraic value of this counter to zero:

If the algebraic value is negative, operation 23 consists in processing the data contained in the received message. However, this message is not stored in the log register corresponding to the source SR1 since the negative value of the counter indicates that broadcasting by the relay is in advance of direct broadcasting of the messages by the source SR1. There is therefore no particular problem.

If the algebraic value of the counter is positive or zero, operation 22 consists in deleting the oldest message stored in the log register corresponding to the source that sent the received message, because the reception of this message via the relay process cancels out all or part of the time-delay of broadcasting by the relay relative to the direct broadcast. Operation 23 then consists in processing the data from the received message in the processing part of the process that received the message. Finally, operation 6 consists in waiting for another message.

If one of the slave processes SL1, SL2 detects failure of the current relay process MR, the reliable and orderly broadcast protocol, which links all the processes, broadcasts a "relay failed" message to all the application processes. The slave processes all implement a protocol for electing a new relay process, for example on the basis of a criterion of optimal distribution of the workload of the various slave processes. The slave process that is elected as the new relay process activates its part capable of rebroadcasting a series of messages in a reliable and orderly manner. This is the part R1, R2 in the slave processes SL1, SL2 respectively.

FIG. 3 shows the second part of the flowchart of the operation of the first embodiment of the method in accordance with the invention, this part more particularly concerning the operations carried out by an application process when it receives a "relay failed" message.

A first operation 30 consists in receiving this "relay failed" message. Then operation 31 consists in participating in the election of the new relay process. A test 32 determines if the process concerned is the new relay process, common to all the sources:

If the process concerned is not the new relay process, operation 33 simply consists in waiting for a new message.

If it is the new relay process, operation 34 consists in reading each log register of the process and broadcasting all the messages contained in it. Operation 35 then consists in deleting the messages that each log of that process contains. Operation 33 then simply consists in waiting for a new message.

Figure 4:
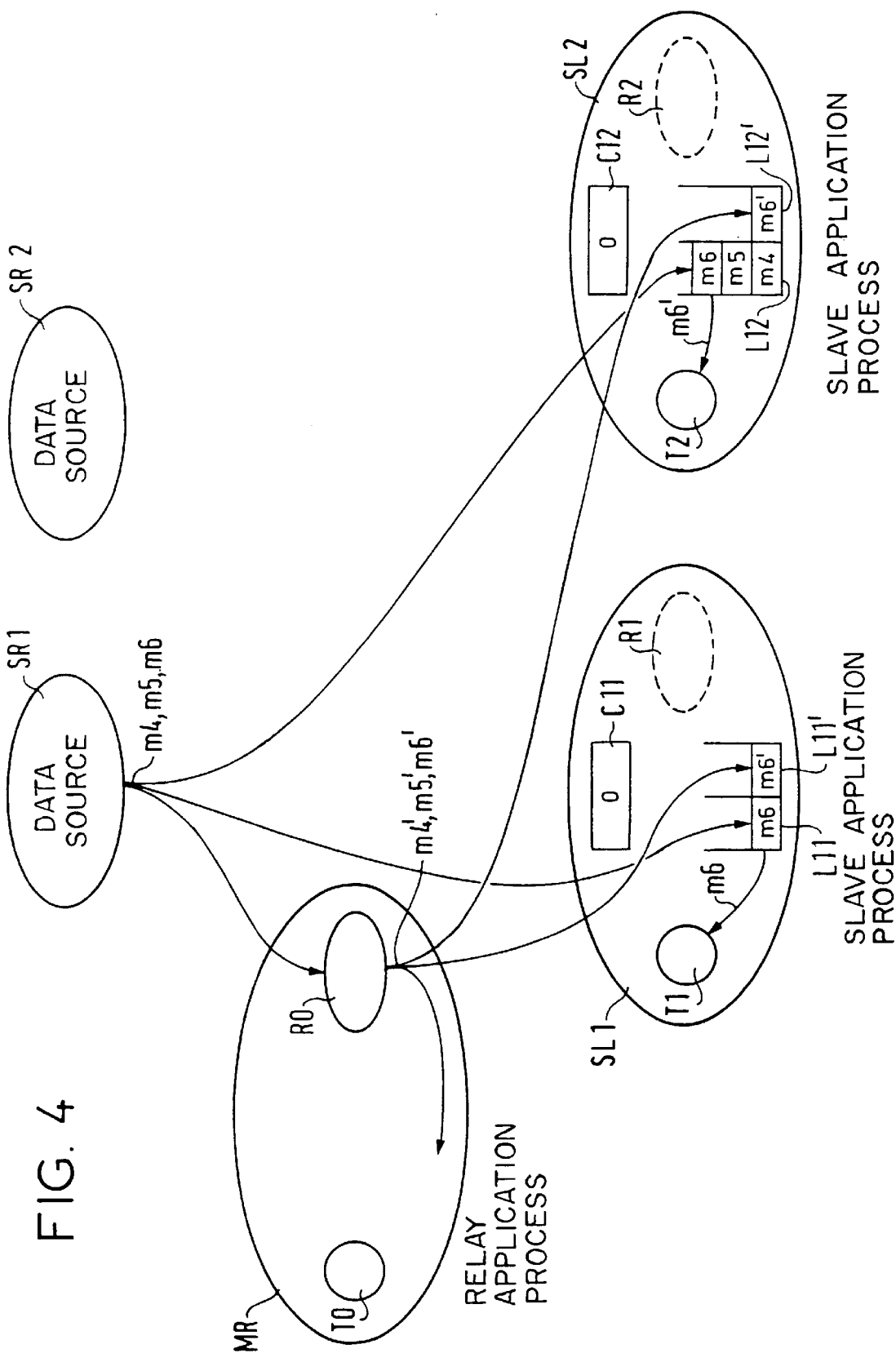
FIG. 4 shows an initialization step of this first embodiment.

FIG. 4 shows the same system as FIG. 1 and illustrates an initialization step of the first embodiment in the method in accordance with the invention. By way of example, FIG. 4 shows:

a first log register L11 and a second log register L11' in the slave process SL1 and corresponding to the source SR1;

a first log register L12 and a second register L12' in the slave process SL2 and corresponding to the source SR1. There is a pair of similar log registers L21 and L22 corresponding to the source SR2 in the slave process SL1, but it has not been shown in FIG. 4 to make the latter clear. Likewise, there is another pair of log registers L22 and L22' corresponding to the source SR2 in the slave process SL2 but it is not shown in FIG. 4.

When a slave process SLj (where j=1, 2, ... ) receives a message from the source SRi (where i=1, 2, ... ) via the relay process MR it compares the contents of the two log registers Lij and Lij' corresponding to the source SRi. If it detects that it has received the same message directly (the message is in Lij) and via the relay process MR (the same message is in Lij') the initialization phase terminates. It loads the counter Cij with a value corresponding to the time-delay or the advance that it finds:

It loads a zero value into the counter if it finds that there is no time-delay of broadcasting by the relay process MR relative to direct broadcasting by the source SR1 (the message it has just received via the relay process corresponds to the last message received directly from the source). It then processes the last message received and deletes the content of the log registers Lij and Lij', if any.

It loads a value +n into the counter if it finds that there is a time-delay of n messages for broadcasting by the relay process MR relative to direct broadcasting by the source SR1 (the message that it has just received via the relay process is followed by n messages in the log register storing messages received directly from the source). It then processes the last message received and deletes the content of the log registers Lij and Lij', if any, with the exception of messages stored in Lij not yet received via the relay process MR.

FIG. 4 illustrates the initialization phase by means of an example in which the source SR1 sends a series of messages m4, m5, m6 to all the application processes MR, SL1, SL2. The messages are received by the relay process MR in the order m4–m5–m6 and are rebroadcast by the part R0 in a reliable and orderly manner in the form of a series of messages m4'–m5'–m6' which are therefore received in that order by the processing part T0 of the relay process MR and by the slave processes SL1, SL2.

The slave process SL1 starts up under conditions such that it receives only the messages m6 and m6'. It stores m6 in the first log register L11 and m6' in the second log register L11'. It compares the contents of the two log registers L11 and L11' corresponding to the source SR1 and detects that it has received the same message directly and via the relay process MR. As m6' corresponds to the last message from Lij, it loads the counter C11 with the value 0. It transmits the message m6' to the processing part T1. It then deletes the contents of the log registers L11 and L11'.

The slave process SL2 starts up under conditions such that it receives the messages m5 and m6 directly from the source SR1. It stores them in the first log register L12. It also receives the message m5' broadcast by the relay process MR. On the other hand, it never receives the message m4' that preceded the message m5'. It stores m5' in the second log register L12'. It compares the contents of the two log registers L12 and L12' and concludes that the broadcast via the relay process MR is subject to a time-delay corresponding to one message, i.e. the message m6. It therefore loads the counter C12 corresponding to the source SR1 with the value +1. It transmits the message m5 to the process part T2. It then deletes all the messages from the log register L12 except for the message m6 and deletes the contents of the log register L12'.

When the initialization phase has terminated, it is possible to detect and to remedy any broadcast time-delay due to failure of the relay process. Consequently, the order and the consistency of the messages are protected against failure of the relay process.

FIG. 5 shows the operation of the same system immediately after the initialization phase. In the situation represented a message m10 reaches the slave process SL2 faster via the relay process MR (as message m10')than the direct broadcast (as message m10 per se). On the other hand, the replica m10' broadcast by the part R0 of the relay process MR reaches the slave process SL1 faster When the original message m10.

When the slave process SL1 receives the message m10', it decrements the counter C11 by one unit. At the time in question it contains a value 0. The counter C11 thereafter contains a value −1, a negative value indicating that broadcasting via the relay process is in advance by one message, from the point of view of the process SL1. The message m10' that has passed through the relay process is transmitted to the processing part T1 for the latter to process the data that the message contains. The first log register L11 remains empty.

Reception of the message m10 by the slave process SL2 causes the counter C12, which previously contained the value 0, to be incremented by one unit. The counter C12 then contains a value +1, a positive value indicating that broadcasting by the relay process MR has a certain time-delay relative to direct broadcasting from the source SR1, from the point of view of the process SL2. The message m10 is then written in the log register L12 that was empty.

FIG. 6 shows what happens after this, when the message m10' replicating the message m10 is received by the slave process SL2 and when the message m10 is received by the process SL1. In the slave process SL1, reception of the message m10 causes the counter C11 to be incremented by one unit. Its content goes to 0, which registers the fact that broadcasting via the relay process MR has a zero time-delay relative to direct broadcasting from the source SR1, from the point of view of the process SL1. The log register L11 remains empty.

When the slave process SL2 receives the message m10' it decrements the value of the counter C12. This value changes from +1 to 0. The fact that this value is zero means that rebroadcasting by the relay process MR is not subject to any time-delay relative to direct broadcasting. The message m10' is transmitted to the processing part T2 for the latter to process the data of the message and the message m10 is deleted from the log register L12.

FIG. 7 shows failure of the relay process MR. A "relay failed" message has been sent by the reliable and orderly broadcast protocol that links all the application process. The slave processes SL1 and SL2 have elected a new relay process. At the time in question, the election is finished and all of the application processes have been advised that SL1 is the new relay process. The application process SL2 remains a slave process. In the new relay process SL1, the part R1 capable of rebroadcasting a series of messages in a reliable and orderly manner is activated to enable the relay function. Its counters, including counter C11, are de-activated.

In the example shown in FIG. 7, the log register L11 in the slave process SL1 and corresponding to the source SR1 contains a single message m7 received direct from the source SR2 and never rebroadcast via the relay process MR, because the latter has failed. When it is advised that it has been elected as the relay process, the process SL1 reads the content of all its log registers. It finds the message m7 in the register L11. The part R1 of the new relay process SL1 rebroadcasts the message m7 in the form of a message m7' to all the application processes. In this way the new relay process SL1 completes the broadcasting of the message m7 that the failed relay process MR had not been able to perform.

The slave process SL2 had also stored the message m7 in its log register L12 and the corresponding counter C12 contains the value +1. When it receives the message m7' the process SL2 decrements the counter 12 by one unit. The value of the counter C12 goes to 0, which means that rebroadcasting by the relay process is not subject to any time-delay relative to direct broadcasting. The message m7' is transmitted to the processing part T2 and the like message m7 is deleted from the log register L12.

In the first embodiment of the method of the invention, described previously, there is only one relay process MR common to all the data sources SR1, SR2. The fact that there is only one relay process guarantees that the series of messages received by the various slave processes SL1, SL2 are identical since they are broadcast by the part R0 of the only process that is used as a relay. In the second embodiment of the method of the invention a plurality of application processes are used as relays. In particular, there may be a respective different relay process for each source. On the other hand, it is not possible for more than one process to be the relay for the same source at the same time. It is also feasible for a relay process to be common to some of the sources but not all of them.

It is then essential for the processes used as relays to apply the same protocol for broadcasting messages in a reliable and orderly manner so that the rebroadcasting of the messages by all of the relay processes is coordinated so that the series of messages retransmitted is in a particular order. European patent application No. 0 650 280 describes a reliable and orderly broadcast protocol of this kind that can be applied simultaneously by a plurality of application processes.

Figure 8:
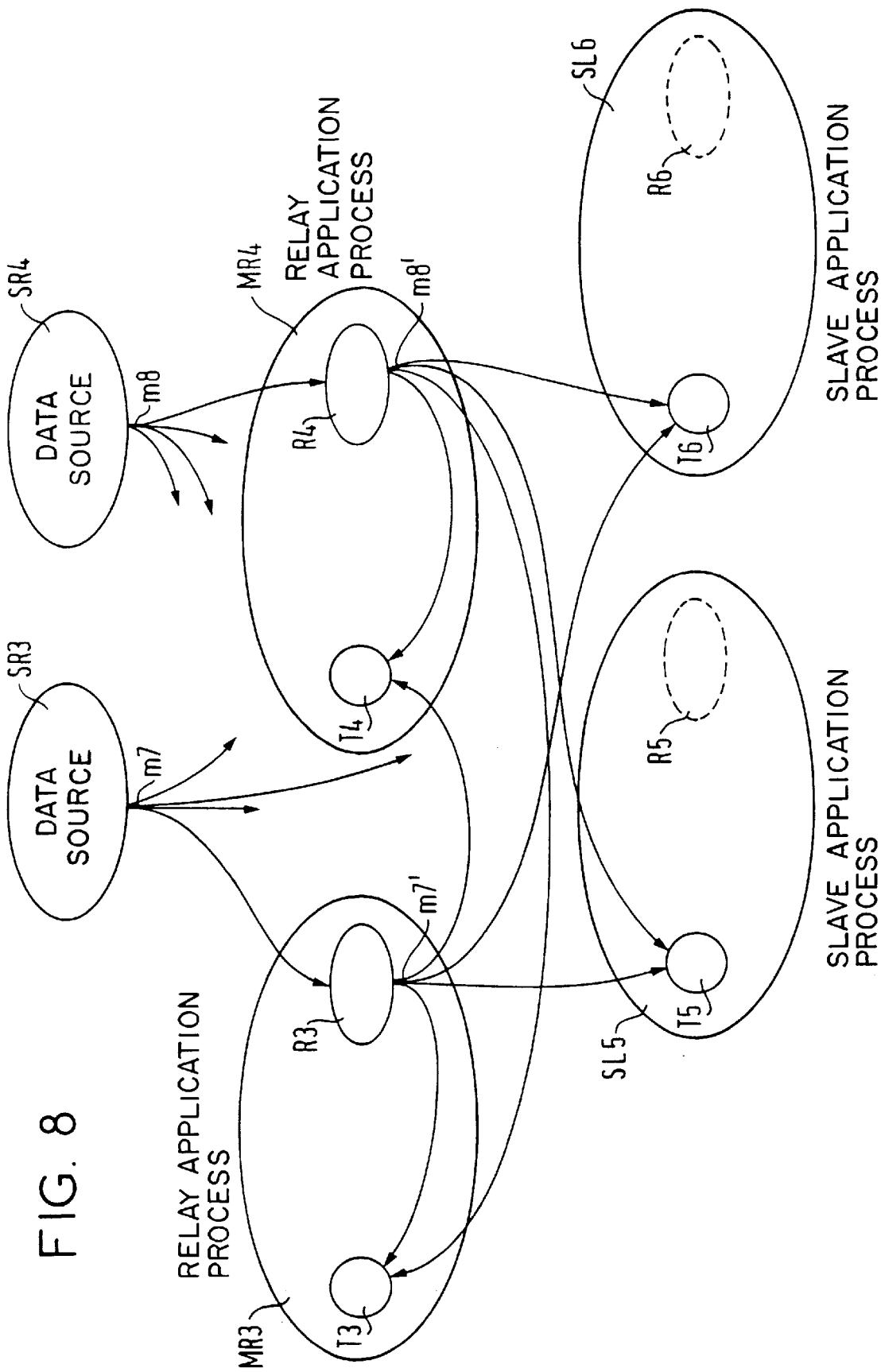
FIG. 8 is a diagram showing a different data processing system and illustrating a second embodiment in which there are a plurality of relay processes respectively corresponding to a plurality of sources.

FIG. 8 shows this second embodiment of the method of the invention in the example of a system including two relay processes MR3 and MR4 respectively rebroadcasting messages transmitted by two sources SR3, SR4. Note that they are also slave processes for the sources SR4 and SR3, respectively. The relay processes MR3 and MR4 include respective processing parts T3 and T4 and two parts R3 and R4 capable of rebroadcasting a series of messages in a reliable and orderly manner using the same protocol. This example further includes two processes SL5 and SL6 that are slaves for the two sources SR3, SR4. The latter include respective processing parts T5 and T6 to process the data from the received messages and parts R5 and R6 for rebroadcasting a series of messages in a reliable and orderly manner in accordance with the same protocol as the parts R3 and R4 if one of these slave processes becomes a relay process in place of a relay process that has failed. The protocol used is that described in European patent application No. 0 650 280, for example.

FIG. 8 shows by way of example the rebroadcasting of a message m7 sent by the source SR3 and the rebroadcasting of a message m8 sent by the source SR4. When the part R3 of the relay process MR3 corresponding to the source SR3 receives the message m7, it recognizes that this message has come from the source SR3. This part R3 rebroadcasts it in the form of a message m7' to all the other application processes SL5, SL6, MR4 and to the processing part T3 of the relay process MR3. The data from the message m7' is then processed by the processing parts T3, T4, T5, T6. In parallel with this, the message m8 is broadcast by the source SR4. When the part R4 of the relay process R4 corresponding to the source SR4 receives the message m8, it recognizes that it was sent by the source SR4. This part R4 rebroadcasts it in the form of a message m8' to all the application processes MR3, SL5, SL6 and to the processing part T4 of the relay process MR4. The data from the message m8' is then processed by the processing parts T3, T4, T5, T6. The sending of m7' and the sending of m8' are coordinated by the reliable and orderly broadcast protocol so that all of the processes receive these messages in the same order, for example m7'–m8'.

The operations carried in the slave processes SL5, SL6 and in the relay processes MR3, MR4 are the same as those described for the first embodiment with reference to FIGS. 2 and 3. There is just one difference: in this second embodiment operations 4 and 15, which determine if the process concerned is the common relay process, determine if the process concerned is the relay process corresponding to the source that sent the message concerned. In a similar way to what has been described for the first example, the slave processes each include a counter, a first log register and a second log register for each source, the second being used only during an initialization phase at the time of starting up the slave process concerned.

In other embodiments of the method of the invention the number of relay processes may be greater than one without being equal to the number of sources, since the same relay process can be used for more than one source. The only condition is that all the processes used as relays include a part capable of rebroadcasting a series of messages in a reliable and orderly manner using the same protocol.

There is claimed:

1. A method of communicating messages between sources and application processes, comprising:

selecting one of said application processes as a master process having a processing task and having a relay task common to all said sources, and selecting others of said application processes as slave processes;

broadcasting messages from each of said sources to said application processes, including said master process and also all of said slave processes, said messages from said sources defining direct messages each with a respective sending source;

receiving said direct messages at said relay task of said master process and also at said slave processes;

rebroadcasting all said direct messages received by said relay task to said processing task of said master process and also to said slave processes, said rebroadcasted direct messages defining corresponding relay messages;

processing, by said processing task of said master process, data in said relay messages; and processing, by said slave processes, data in said relay messages, and not processing data in said direct messages.

2. The method claimed in claim 1, further comprising:

after receiving one of said direct messages at a receiving one of said slave processes, storing said direct message at said receiving slave process when said receiving slave process has not already received one of said relay messages corresponding to said received direct message;

deleting said stored direct message when said receiving slave process subsequently receives said corresponding one of said relay messages;

detecting a failure of said relay task of said master process at said receiving slave process;

determining said receiving slave process to be a new master process with a respective new relay task common to all said sources;

rebroadcasting, by said new relay task, any said stored direct message not already deleted; and deleting, by said new relay task, any said stored direct message after said rebroadcasting.

3. The method claimed in claim 1, further comprising:

decrementing a counter specific to a receiving one of said slave processes when receiving one of said relay messages, said counter relating to said sending source for said received relay message;

incrementing said counter relating to said sending source when said receiving slave process receives one of said direct messages from said sending source; and concluding that said receiving slave process has not already received said relay message corresponding to a received one of said direct messages from said sending source if and only if the algebraic value of said counter relating to said sending source is positive.

4. A method of ordering a plurality of messages from a plurality of sources addressed to a plurality of application processes, each source broadcasting a series of messages in a reliable and orderly manner and each receiving application process being capable of applying the same protocol to broadcast a series of messages in a reliable and orderly manner to all said application processes;

wherein, in order for all said receiving application processes to receive said messages in the same order, said method consists in:

selecting from said application processes a plurality of relay processes, choosing for each of said sources an application process constituting the relay process for that source, the other application processes constituting slave processes for that source, the same application process being a candidate for selection as the relay process for more than one source but each source having only one relay process;

rebroadcasting in a reliable and orderly manner messages broadcast by said source to all said application processes using said application process chosen as the relay process for a source, all said relay processes applying the same reliable and orderly broadcast protocol;

processing in said relay process for a source data from all messages that it receives directly from said source; and processing in said slave processes only data from messages received via said relay processes, data from messages received directly from said sources not being processed.

5. The method claimed in claim 4 wherein, to remedy failure of the current relay process for a source, the method consists in, in each slave process receiving a message from a source for which it is a slave process:

storing it if said slave process has not already received the same message via said relay process for said source;

then deleting it if said slave process receives it subsequently via said relay process for said source; and rebroadcasting and then deleting all messages stored and not yet deleted if the current relay process has failed and if the slave process in question becomes the new relay process common to all said sources.

6. The method claimed in claim 4 wherein, for determining in each process that is a slave process for a source if a message broadcast by said source has already been received by said slave process via said relay process before it is received from said source, said method consists in:

decrementing a counter specific to said slave process and to said source each time that said slave process receives a message from said source via said relay process for said source;

incrementing said counter each time that said slave process receives a message from said source directly; and concluding that said slave process has not already received a message broadcast by a source via said relay process if and only if the algebraic value of said counter is positive.

7. System for ordering a plurality of messages from a plurality of sources addressed to a plurality of application processes capable of processing data from said messages, each source broadcasting a series of messages in a reliable and orderly manner and each receiving application process being capable of broadcasting a series of messages in a reliable and orderly manner to all said application processes, wherein, in order for all said application processes to receive said messages in the same order, said system includes:

means for choosing from said application processes a process constituting a relay process, of which there is one only for all said sources, the other application processes constituting slave processes;

means for rebroadcasting all messages broadcast by said sources from said relay process to all said application processes including said relay process;

means for processing in said relay process data from all messages that it rebroadcasts; and means for processing in said slave processes only data from messages received via said relay process, data from messages received directly from said sources not being processed.

8. The system claimed in claim 7 wherein, to remedy failure of the current relay process, it includes in each slave process receiving a message:

means for storing said message if said slave process has not already received it via said relay process;

means for subsequently deleting it if said slave process subsequently receives it via said relay process; and means for rebroadcasting and then deleting all messages stored and not yet deleted if the current relay process fails and if the slave process concerned becomes the new relay process common to all said sources.

9. The system claimed in claim 7 wherein, in order to determine in each slave process if said slave process has already received a message broadcast by a source via said relay process before receiving it directly from said source, said system includes:

means for decrementing a counter specific to said slave process and to said source each time that said slave process receives a message from said source via said relay process;

means for incrementing said counter each time that said slave process receives a message directly from said source; and means for concluding that said slave process has not already received a message broadcast by a source via said relay process if and only if the algebraic value of said counter is positive.

10. System for ordering a plurality of messages from a plurality of sources addressed to a plurality of application processes, each source broadcasting a series of messages in a reliable and orderly manner and each receiving application process being capable of applying the same protocol to broadcast a series of messages in a reliable and orderly manner to all said receiving application processes, wherein, in order for all said application processes to receive said messages in the same order, said system includes:

means for choosing from said application processes a plurality of processes constituting relay processes, choosing for each source an application process constituting a relay process for said source, the other application processes constituting slave processes for said source, the same application process being a candidate for choice as the relay process for more than one source but each source having only one relay process;

means for rebroadcasting in a reliable and orderly manner messages broadcast by said source to all said application processes using said application process chosen as the relay process for a source, all said relay processes applying the same reliable and orderly broadcast protocol;

means for processing in said relay process for a source data from all messages that it receives directly from said source; and means for processing in said slave processes only data from messages received via said relay processes, data from messages received directly from said sources not being processed.

11. The system claimed in claim 10 wherein, in order to remedy failure of the current relay process for a source, said system includes in each slave process receiving a message from a source for which it is a slave process:

means for storing a message if said slave process has not received the same message already via said relay process of said source;

means for subsequently deleting it if said slave process subsequently receives it via said relay process for said source, and means for rebroadcasting and then deleting all messages stored and not yet deleted if the current relay process fails and if the slave process concerned becomes the new relay process for said source.

12. The system claimed in claim 10 wherein, for determining in each slave process for a source if said slave process has already received a message broadcast by said source via said relay process before receiving it directly from said source, said system includes:

means for decrementing a counter specific to said slave process and to said source each time said slave process receives a message from said source via said relay process for said source;

means for incrementing said counter each time said slave process receives a message from said source directly; and means for concluding that said slave process has not already received a message broadcast by a source via said relay process if and only if the algebraic value of said counter is positive.

* * * * *